Aug. 8, 1939.  W. L. STEINHAUER  2,168,500
ADJUSTABLE DISCHARGE SLIDE FOR COTTON FEEDERS
Filed May 2, 1938  2 Sheets-Sheet 1
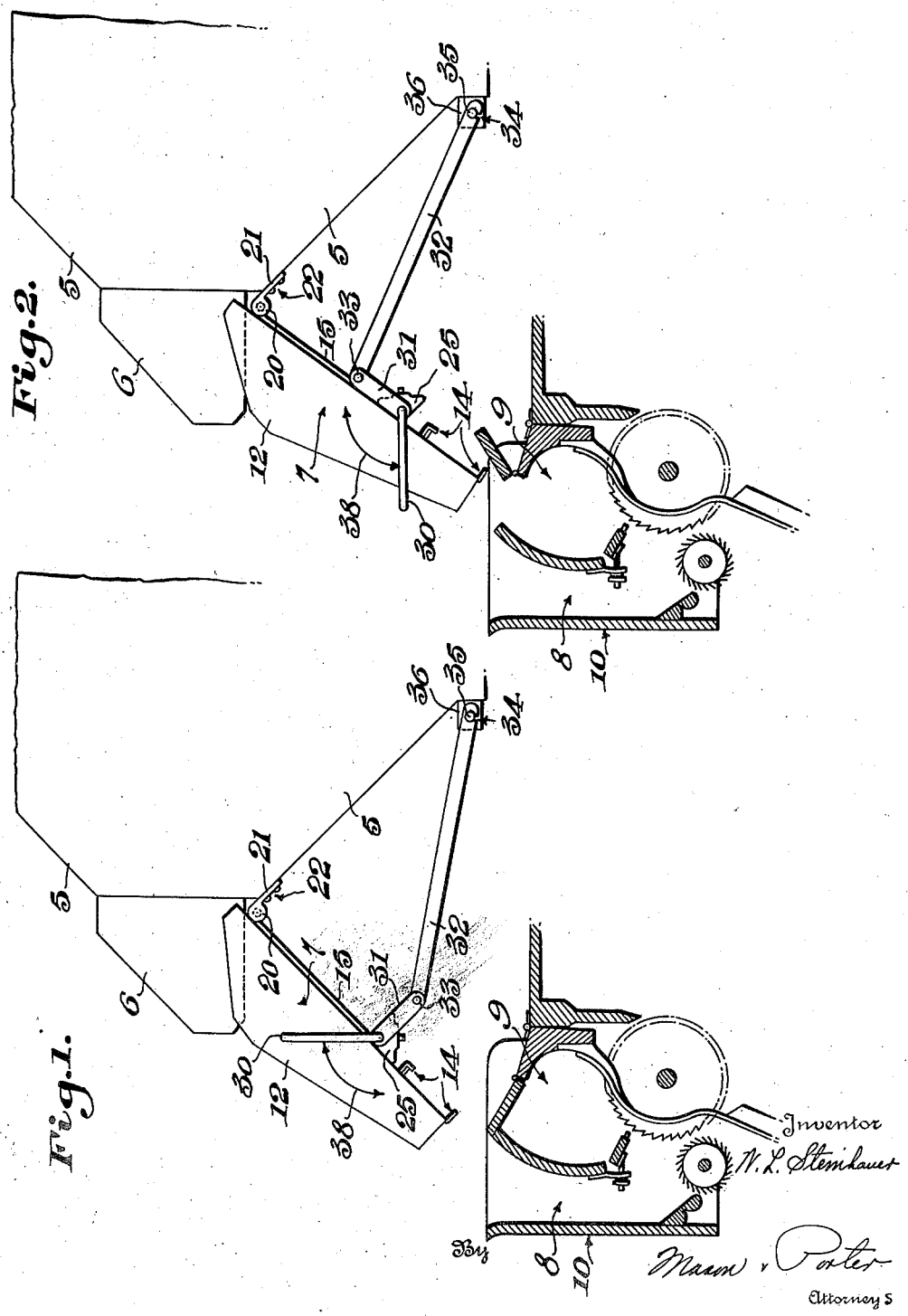

Aug. 8, 1939.  W. L. STEINHAUER  2,168,500
ADJUSTABLE DISCHARGE SLIDE FOR COTTON FEEDERS
Filed May 2, 1938   2 Sheets-Sheet 2
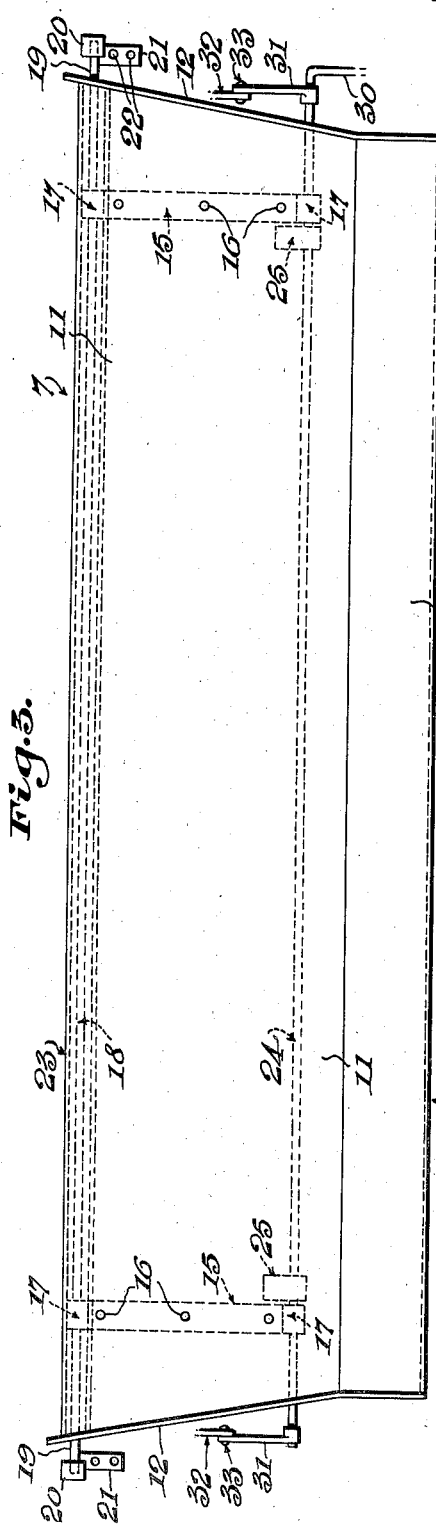
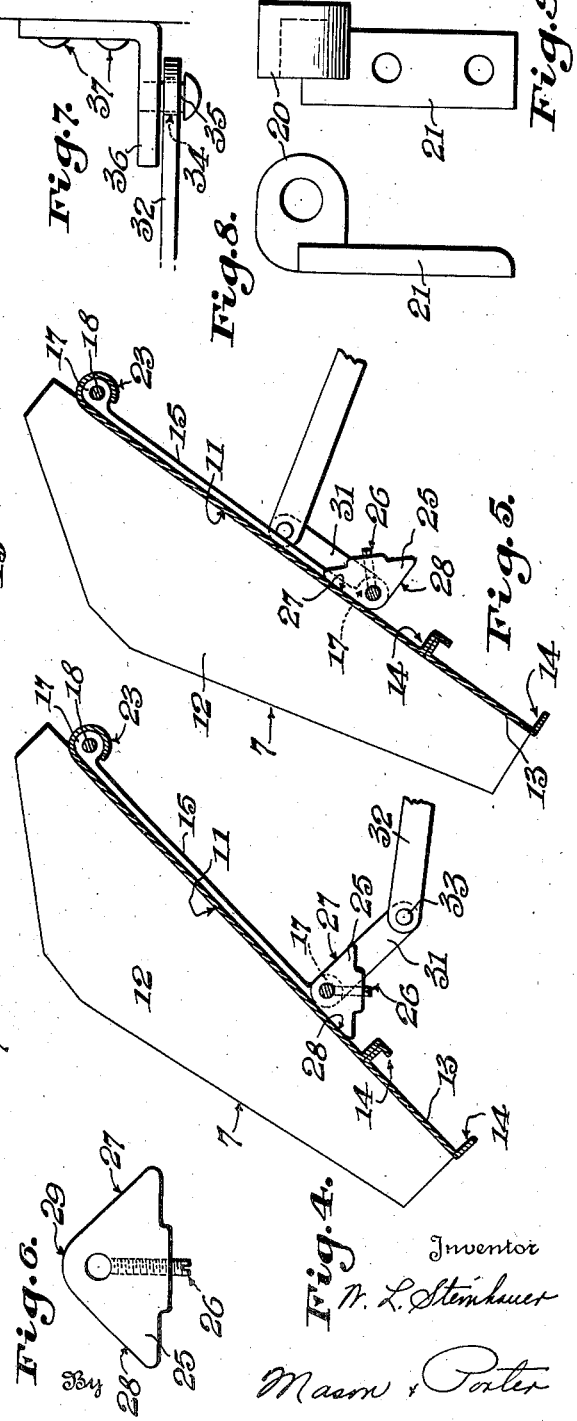

Patented Aug. 8, 1939

2,168,500

UNITED STATES PATENT OFFICE 2,168,500

ADJUSTABLE DISCHARGE SLIDE FOR COTTON FEEDERS

William L. Steinhauer, Columbus, Ga., assignor to Cen-Tennial Cotton Gin Co., Columbus, Ga., a corporation Application May 2, 1938, Serial No. 205,609

4 Claims. (Cl. 193—17)

The invention relates generally to the art of preparing cotton for the market and primarily seeks to provide a novel form of chute or slide for delivering cotton from the discharge hood of an extractor or feeder to the huller gin and which is adjustable for the purpose of delivering the cotton into the inner or outer roll box of the gin.

Fresh picked cotton varies greatly in the amount of trash included in the harvest. One batch of the harvest may be comparatively clean and free from trash, whereas another batch, of the same or another harvest will include a great amount of trash. When the cotton is comparatively clean it can be passed directly into the ginning roll box, but when it contains a considerable amount of hulls and trash it is passed into the hull roll box.

The invention therefore has for an object to provide a novel form of delivery slide which is adjustable to deliver the cotton into the outer or huller roll box, or into the inner or ginning roll box, accordingly as said cotton is hull and trash laden or clean.

Another object of the invention is to provide a slide structure of the character stated which includes novel toggle link, stop and actuating lever equipments for effecting and maintaining the selective positioning of the slide.

With the above and other objects in view which will more fully appear, the nature of the invention will be more clearly understood by following the description, the appended claims, and the several views illustrated in the accompanying drawings.

In the drawings:

Figures 1 and 2 are end elevations illustrating the two positions of use of the slide, fragments of gin structures also being shown in cross-section;

Fig. 3 is a face view of the slide;

Figs. 4 and 5 are detail vertical cross-sections taken at the position of one of the stop blocks and illustrating the two positions of adjustment of the slide;

Fig. 6 is an enlarged detail side elevation of one of the stop blocks;

Fig. 7 is an enlarged detail plan view of one of the toggle link end supporting brackets;

Figs. 8 and 9 are enlarged detail side and face views of one of the slide pivot brackets.

In the drawings I have illustrated the invention operatively applied in cooperative relation with an extractor feeder and a huller gin structure, fragments of each of which are illustrated in Figs. 1 and 2. The extractor feeder structure is generally designated 5 and the cotton is delivered from the discharge hood 6 thereof onto the slide or chute structure forming the subject matter of the present invention and generally designated 7.

The slide is swingably supported on the extractor feeder structure as shown in Figs. 1 and 2 of the drawings so that it can be swung to one or the other of its selective positions for delivering to the outer or hull roll box 8, or to the inner or ginning roll box 9 of the huller gin structure generally designated 10.

The slide includes a flat pan or chute-like body 11 having slightly converging side walls 12 and a discharge lip portion 13 having parallel side walls and reinforce edge portions 14 for increasing the rigidity of the discharge end of the slide structure. Two hangers or reinforce straps 15 are secured as at 16 to the slide in parallel spaced relation as shown in Figs. 3, 4 and 5 of the drawings. Each hanger 15 includes a roll or bearing portion 17 at each end thereof, and a mounting rod 18 is supported in the upper pair of rolls 17 and is projected at the ends of the slides to form trunnions 19 rockably supported in the bearing hubs 20 in a pair of bearing brackets 21 secured as at 22 to the extractor feeder structure. See Figs. 1, 2 and 3. The upper edge portion of the pan or chute 11 is rolled about the bearing portions 17 as indicated at 23 in Figs. 3, 4 and 5.

A cross rod 24 is rockably supported in the lower pair of rolls or bearing portions 17, and a triangular stop block 25 is secured as at 26 to the rod 24 adjacent and inwardly of each hanger strap 15. See Figs. 3 to 6 of the drawings. Each stop block 25 includes stop faces 27 and 28 bearing right angular relation and separated by an intermediate portion 29 which is concentric with the axis of the rod 24.

The rod 24 is equipped with or shaped to form an operating handle portion 30, at one or both ends, and a short link 31 is secured at each end of the rock shaft as shown in Figs. 3, 4 and 5 of the drawings.

To each of the short links 31 a long link 32 is pivotally connected as at 33 and each long link includes a notch 34 for pivotally engaging a pin 35 projecting laterally from a bracket member 36 secured as at 37 to the extractor feeder structure 5, as shown in Figs. 1, 2 and 7 of the drawings.

By swinging the control lever or handle 30 in an arcuate path as indicated by the arrow 38, the stop blocks 25 and toggle link equipments 31, 32 can be shifted from the position illustrated in Figs. 1 and 4 of the drawings to that illustrated in Figs. 2 and 5. As has been previously stated, when the parts are positioned as shown in Fig. 1, the cotton will be delivered into the outer or hull roll box 8, and the stop block surfaces 28 will be in link movement limiting engagement with the slide body 11. When the parts are shifted to the position shown in Fig. 2, the slide will deliver the cotton to the inner or ginning roll box 9 and the stop block surfaces 27 will be in link movement limiting engagement with the slide body 11. See Figs. 4 and 5.

It is of course to be understood that the details of structure and arrangement of parts may be variously changed and modified without departing from the spirit and scope of my invention.

What I claim is:

1. A cotton feeding slide comprising a chute member, means for swingably mounting the member for selectively delivering cotton in one or another of two positions, a shaft rockably supported on said member, a lever for rocking the shaft, a pair of links pivotally connected together, one said link having pivotal connection with a stationary support and the other said link being rigidly connected with said shaft whereby rocking of said shaft will alter the angular relation of said links and select a position for said member, and means for maintaining selected positions of said member.

2. A cotton feeding slide comprising a chute member, means for swingably mounting the member for selectively delivering cotton in one or another of two positions, a shaft rockably supported on said member, a lever for rocking the shaft, a pair of links pivotally connected together, one said link having pivotal connection with a stationary support and the other said link being rigidly connected with said shaft whereby rocking of said shaft will alter the angular relation of said links and select a position for said member, and a stop block secured to the shaft and engageable with said member for maintaining selected positions of said member.

3. A cotton feeding slide comprising a chute member, a pair of hanger members secured in parallel spaced relation on said member and each having a bearing roll at each of its upper and lower ends, a bearing shaft supported in the upper rolls and extending from the ends of said member, means for pivotally supporting said shaft ends, a rock shaft supported in said lower rolls, a lever secured to the rock shaft, a pair of links secured to the rock shaft, a pair of links each pivoted at one end to one of the rock shaft links and at its other end to a fixed support, and a stop block secured to the rock shaft adjacent each hanger member and having two angularly disposed faces engageable with the chute member for holding the links in selected angular relations and maintaining positions of said chute member selected by adjustment of said lever.

4. A cotton feeding slide comprising a chute member, a pair of hanger members secured in parallel spaced relation on said member and each having a bearing roll at each of its upper and lower ends, a bearing shaft supported in the upper rolls and extending from the ends of said member, means for pivotally supporting said shaft ends, a rock shaft supported in said lower rolls, a lever secured to the rock shaft, a pair of links secured to the rock shaft, a pair of links each pivoted at one end to one of the rock shaft links and at its other end to a fixed support, and a stop block secured to the rock shaft adjacent each hanger member and having two angularly disposed faces engageable with the chute member for holding the links in selected angular relations and maintaining positions of said chute member selected by adjustment of said lever, the links secured to said rock shaft being considerably shorter than the remaining links.

WILLIAM L. STEINHAUER.